US012061108B2

(12) United States Patent
Lathouris et al.

(10) Patent No.: US 12,061,108 B2
(45) Date of Patent: Aug. 13, 2024

(54) WATER SOFTENER SALT MONITORING SYSTEM

(71) Applicant: CULLIGAN INTERNATIONAL COMPANY, Rosemont, IL (US)

(72) Inventors: Bill Lathouris, Arlington Heights, IL (US); Eugene Boglio, Glendale Heights, IL (US); Doug Anderson, St. Charles, IL (US); Tedd Schneidewend, Glen Ellyn, IL (US)

(73) Assignee: CULLIGAN INTERNATIONAL COMPANY, Rosemont, IL (US)

( * ) Notice: Subject to any disclaimer, the term of this patent is extended or adjusted under 35 U.S.C. 154(b) by 301 days.

(21) Appl. No.: 17/448,739

(22) Filed: Sep. 24, 2021

(65) Prior Publication Data
US 2022/0113178 A1 Apr. 14, 2022

Related U.S. Application Data

(60) Provisional application No. 63/089,963, filed on Oct. 9, 2020.

(51) Int. Cl.
*G01F 23/292* (2006.01)
*C02F 1/42* (2023.01)

(52) U.S. Cl.
CPC .......... *G01F 23/2922* (2013.01); *C02F 1/42* (2013.01); *C02F 2209/005* (2013.01); *C02F 2209/42* (2013.01); *C02F 2303/14* (2013.01)

(58) Field of Classification Search
CPC .. G01F 23/2922; C02F 1/42; C02F 2209/005; C02F 2209/42; C02F 2303/14
(Continued)

(56) References Cited

U.S. PATENT DOCUMENTS 3,603,149 A 9/1971 Mckown
3,627,133 A * 12/1971 Rak .................. C02F 1/4674
210/140

(Continued)

FOREIGN PATENT DOCUMENTS

CN 108585117 A 9/2018
DE 2911366 C2 6/1989
(Continued)

OTHER PUBLICATIONS

Watercare, Product Description for "Water Care (SD-100V-US) Saltdetect II Low Salt Level Alarm for Water Softeners; 110V," Part No. SD-110V-US, retrieved from the Internet on May 13, 2020, 1 page.
(Continued)

*Primary Examiner* — Zhen Y Wu
(74) *Attorney, Agent, or Firm* — Greer, Burns & Crain Ltd (57) ABSTRACT

A water softener salt monitoring system includes a brine tank configured for retaining a quantity of salt, a quantity of water and having a bottom, a sensor secured to the brine tank and constructed and arranged for sending a signal to the bottom, the sensor including a receiver configured for receiving a reflected signal off of at least one of the quantity of salt, the quantity of water and the bottom, and a controller connected to the sensor and programmed to compare the reflected signals with preset values, and for generating an alarm signal upon receipt of deviations from the preset values.

21 Claims, 9 Drawing Sheets

(58) Field of Classification Search
USPC .......................................................... 340/619
See application file for complete search history.

(56) References Cited

U.S. PATENT DOCUMENTS

| | | | | |
|---|---|---|---|---|
| 3,684,457 | A * | 8/1972 | Pinto | C01D 3/04 |
| | | | | 422/111 |
| 3,817,381 | A * | 6/1974 | Heskett | B01J 47/024 |
| | | | | 210/140 |
| 4,455,873 | A * | 6/1984 | Abts | G10K 11/352 |
| | | | | 73/632 |
| 5,643,425 | A * | 7/1997 | Amano | C02F 1/4674 |
| | | | | 210/257.2 |
| 5,651,880 | A * | 7/1997 | Johnson | C02F 1/42 |
| | | | | 210/126 |
| 6,456,202 | B2 | 9/2002 | Johannsen et al. | |
| 6,581,461 | B1 | 6/2003 | Diaz | |
| 6,679,115 | B2 | 1/2004 | Heidecke | |
| 6,684,919 | B2 | 2/2004 | Gaiser | |
| 6,696,963 | B2 | 2/2004 | Zimmerman et al. | |
| 6,696,966 | B2 | 2/2004 | Bearak | |
| 8,180,489 | B2 | 5/2012 | Quinn et al. | |
| 9,791,308 | B2 | 10/2017 | Pesz et al. | |
| 2002/0195403 | A1 * | 12/2002 | Takeda | B01J 49/85 |
| | | | | 210/96.1 |
| 2004/0188330 | A1 | 9/2004 | Slawson et al. | |
| 2005/0068186 | A1 * | 3/2005 | Wanie | G01F 23/603 |
| | | | | 340/624 |
| 2006/0114593 | A1 * | 6/2006 | Sagaert | G01F 23/296 |
| | | | | 360/72.2 |
| 2008/0047881 | A1 * | 2/2008 | Buck | C02F 1/00 |
| | | | | 210/85 |
| 2008/0283472 | A1 * | 11/2008 | Scott | B09B 3/00 |
| | | | | 210/759 |
| 2009/0027200 | A1 | 1/2009 | Herbert et al. | |
| 2010/0101317 | A1 | 4/2010 | Ashrafzadeh et al. | |
| 2010/0241277 | A1 * | 9/2010 | Humphrey | F17C 13/00 |
| | | | | 700/282 |
| 2011/0180395 | A1 * | 7/2011 | Tucker | C02F 1/4674 |
| | | | | 204/229.4 |
| 2015/0321768 | A1 * | 11/2015 | Kumar | G08B 13/19673 |
| | | | | 340/870.07 |
| 2016/0123787 | A1 | 5/2016 | Burgert et al. | |
| 2016/0292990 | A1 * | 10/2016 | Pesz | G01F 23/0007 |
| 2018/0111538 | A1 * | 4/2018 | Detter | B60P 1/42 |
| 2019/0170560 | A1 | 6/2019 | Rohr et al. | |
| 2020/0255301 | A1 | 8/2020 | Budampati et al. | |

FOREIGN PATENT DOCUMENTS

| | | |
|---|---|---|
| GB | 1160928 A | 8/1969 |
| IN | 209979022 U | 1/2020 |
| KR | 20080005096 U | 11/2008 |
| WO | 2001046653 A1 | 6/2001 |
| WO | 020844230 A1 | 10/2002 |
| WO | 2018081078 A1 | 5/2018 |

OTHER PUBLICATIONS

CSI Water Treatment Systems, Product Description for "Low Salt Level Alarm Sensor for Water Softeners CSI R2014 Wireless," Part No. R2014, retrieved from Amazon.com on May 13, 2020, 1 page.

European Search Report and Written Opinion received for Application No. 21200672.0, dated Jan. 27, 2022.

* cited by examiner

WATER SOFTENER SALT MONITORING SYSTEM

RELATED APPLICATION

The present application is a Non-Provisional of, and claims 35 USC 119 priority from, U.S. Provisional Application Ser. No. 63/089,963 filed Oct. 9, 2020, the entire contents of which are incorporated by reference herein.

BACKGROUND

The present invention relates generally to brine tanks used with water softeners, and in particular, to an improved salt level sensing system for use with water softener or ion exchange system brine tanks.

Conventional water softener systems treat hard water using an ion exchange resin that absorbs mineral ions from the hard water. The resin capacity is gradually depleted as the ion exchange process is repeated, thus the resin requires periodic regeneration. In conventional systems, the resin is periodically regenerated by passing a brine solution containing a salt through the resin, whereby the salt ions replace the mineral ions in the resin. The mineral ions are flushed from the system to drain.

The brine solution is typically produced in a brine tank by the dissolution of salt in water. After repeated regeneration cycles, the salt supply in the brine tank is depleted and must be periodically replaced for the water softener to function properly. In most conventional water softeners, a user must manually monitor the salt level and visually estimate the salt level in the tank. This manual determination of the salt level is inconvenient for the user, who must frequently inspect the tank to ensure there is sufficient salt levels for the water softener to function properly.

Furthermore, visually estimating the salt level in the tank is often inaccurate, particularly when salt bridges are formed. Salt bridges can make the volume of salt in the tank seem greater than what is actually present, as the salt under the salt bridge may be substantially dissolved. A user visually inspecting the salt levels often has no way to tell that a salt bridge has formed and may overestimate the amount of salt left in the tank.

Commonly-assigned U.S. Pat. No. 6,696,966 discloses a salt level monitoring system that includes sensors that are enclosed in a protective tube that is inserted into the brine tank through the stored salt. Linearly spaced sensors monitor the level of salt in the tube. While effective, this system has been prone to degradation or corrosion from prolonged immersion in the salt.

Additionally, most conventional water softener systems have no measures in place to monitor their operation to detect for brine tank overfill, leaks to the brine tank, or brine dosage issues. A user is left to manually inspect for these issues, which often go undetected and lead to further operational issues with the water softener and/or water damage to the surrounding area of the residence of business.

Because of the above listed issues, there is a need for a brine tank salt level monitoring system that does not require apparatus to be inserted into the stored salt. There is also a need for a water softener system that can automatically detect for operational errors so that they may be corrected for without relying on a user manually inspecting the system.

SUMMARY

The above-listed needs are met or exceeded by the present salt level monitoring system for use with a water softener. The monitoring system includes a level sensor that periodically measures the salt level within the brine tank without making contact with the salt. In a preferred embodiment, the present monitoring system employs a Time of Flight (ToF) sensor to send out a light beam or laser from an emitter. However, other known sound or light generating measuring technologies are contemplated. A receiver associated with the sensor measures the time it takes for the emitted signal to return to the sensor. An algorithm is used to process the signal and translate the signal to a measurement of salt remaining in the tank, such as through calculation of a distance of the level of salt to the sensor. Such measurements are contemplated as including a percentage of salt in the tank, distance to the bottom of the tank, weight of the salt in the tank, among other parameters. It is preferred that the sensor is encased in a waterproof housing to prevent damage from humidity and the liquid often splashing within the tank. A cover for the sensor is in the form of a lens cap that is easily cleaned by the user or a technician.

Test data reveal that as the amount of salt remaining diminishes in the brine tank, the ToF sensor signal takes longer to return to the receiver. When the measured salt level varies from an expected value by more than a threshold amount, corrective procedures are initiated. In one example, the system is configured for taking salt level readings once every operational cycle, preferably after brine draw. In the event successive readings, taken after successive cycles, obtain similar level values, the presence of a salt bridge is indicated, causing the controller to generate an appropriate alarm signal. In other words, detecting a measured lack of change in the time/distance value causes the system to generate an alarm. In the present system, alarms are contemplated as being audible and/or visual, such as shown on a controller display screen. In some configurations, it is contemplated that the system is optionally connected via Bluetooth or Wi-Fi allowing a warning to be sent to a user through a phone or computer application.

In a preferred embodiment, the ToF sensor is positioned in the brine tank in close proximity to the brine well, such as between 2-5 inches away from the brine well. Also, the ToF sensor is positioned near the top of the brine tank, and is oriented so that a projected light beam is directed at a central region of a bottom of the brine tank. In an embodiment, the beam is directed to a floor located above the bottom of the brine tank. An important feature of the present ToF sensor is that it is mounted within the brine tank to avoid physical contact with the salt.

More specifically, a monitoring system is provided for use in a tank configured to house a volume of material. A sensor is secured within the tank to avoid contact with the volume of material and is configured to periodically gauge the level of the material within the tank by transmitting a signal to the volume of material. A receiver associated with the sensor is connected to a controller programmed to measure the received signal, taking the form of a level reading and compare the most recent level reading with at least one previous level reading, and to take corrective action when the most recent level readings differs from an expected value.

Another feature of the present system is that the controller is configured so that erratic measurement values, deviating from a pre-programmed expected increase in signal return time/distance from the salt level to the sensor, are considered indicative of dirty salt and the programmer is configured for generating an appropriate alarm signal. Further, rate of change of signal return time/distance from the salt level to the sensor over time is also calculated in the programmer, such that changes of the rate of depletion are reflective of a type of salt used in the brine tank. Yet another feature of the present system is that the programmer is configured so that a measured signal return time/distance from the salt level that is inconsistently shorter/closer is an indication that the water level in the brine tank is higher than the salt level, indicating further that the brine has not fully drawn due to a softener system leak or malfunction, and an appropriate alarm is generated. Successive shorter/closer readings are indicative of a high water level in the brine tank, also causing generation of an alarm signal. In another aspect, unexpected rapid depletion of the salt level from a rapid increase in signal time/distance is indicative of an unusually high dosage of salt, inferring a leak in the brine tank, or higher than expected brine dosages being used on each cycle.

By altering the interval of the generation of the sensor signal, such as on a per hour basis rather than a cycle stage (brine draw), the present system is used for monitoring for leaks in the softener or brine tanks. Also, repeated readings of shorter/closer signals indicates that the liquid level in the brine tank is unusually high, indicating a brine draw failure, also causing the generation of an appropriate alarm.

More specifically, a water softener salt monitoring system is provided, including a brine tank configured for retaining a quantity of salt, a quantity of water and having a bottom, a sensor secured to the brine tank and constructed and arranged for sending a signal to the bottom, the sensor including a receiver configured for receiving a reflected signal off of at least one of the quantity of salt, the quantity of water, the floor and the bottom, and a controller connected to the sensor and programmed to compare the reflected signals with preset values, and for generating an alarm signal upon receipt of deviations from the preset values.

In an embodiment, the brine tank includes a brine well disposed within the tank, the sensor is attached to the brine well. In an embodiment, the sensor is mounted approximately 2-5 inches from the brine well. In an embodiment, the sensor generates a beam focused on a central region of the bottom.

In a preferred embodiment, the sensor is enclosed in a protective case including a lens cap covering a signal transmitter of the sensor. In an embodiment, the controller includes a programmable processor, a user display, at least one user input, and at least one speaker. In an embodiment, a floor is disposed above the bottom of the brine tank and is the target of the sensor signal.

In an embodiment, the sensor is configured for generating a signal each time brine draw begins, and the controller is configured so that upon multiple signals are received indicating the same salt level, an alarm signal is generated. In an embodiment, the sensor is configured for generating a signal at a regular interval, and the controller is configured so that upon the received signal depicting a slower than average decline of salt level, indicating low brine dosage, an alarm signal is generated. In an embodiment, the sensor is configured for generating a signal at a regular interval, and the controller is configured so that upon the received signals depicting an increased salt level, an alarm signal is generated. In an embodiment, the sensor is configured for generating a signal at a regular interval, and the controller is configured so that upon the received signals depicting an increased rate of salt usage, reflecting high brine dosage, an alarm signal is generated.

In an embodiment, the sensor is configured for generating a signal at a regular interval, and the controller is configured to that upon the received signals indicating a first phase of regular salt consumption, followed by a second phase of decreased salt consumption, indicating a leak to the brine tank, an alarm signal is generated.

In another embodiment, a water softener salt monitoring system is provided, including, a brine tank configured for retaining a quantity of salt, a quantity of water and having a bottom, a sensor secured to the brine tank and constructed and arranged for sending a signal to the bottom, the sensor including a receiver configured for receiving a reflected signal off of at least one of the quantity of salt, the quantity of water and the bottom, a controller connected to the sensor and programmed to compare the reflected signals with preset values, and for generating an alarm signal upon receipt of deviations from the preset values, the brine tank includes a brine well disposed within the tank, the sensor being attached to the brine well at an angular orientation so that the sensor generates a beam focused on a central region of the bottom.

In still another embodiment, a monitoring system is provided for use in a tank configured to house a volume of material, including a sensor secured within the tank to avoid contact with the volume of material and configured to periodically gauge a level of the material within the tank by transmitting a signal to the volume of material, and a receiver associated with the sensor and connected to a controller programmed to measure the received signal, taking the form of a level reading and compare the most recent level reading with at least one previous level reading, and to take corrective action when the most recent level readings differs from an expected value.

DETAILED DESCRIPTION

Figure 1:
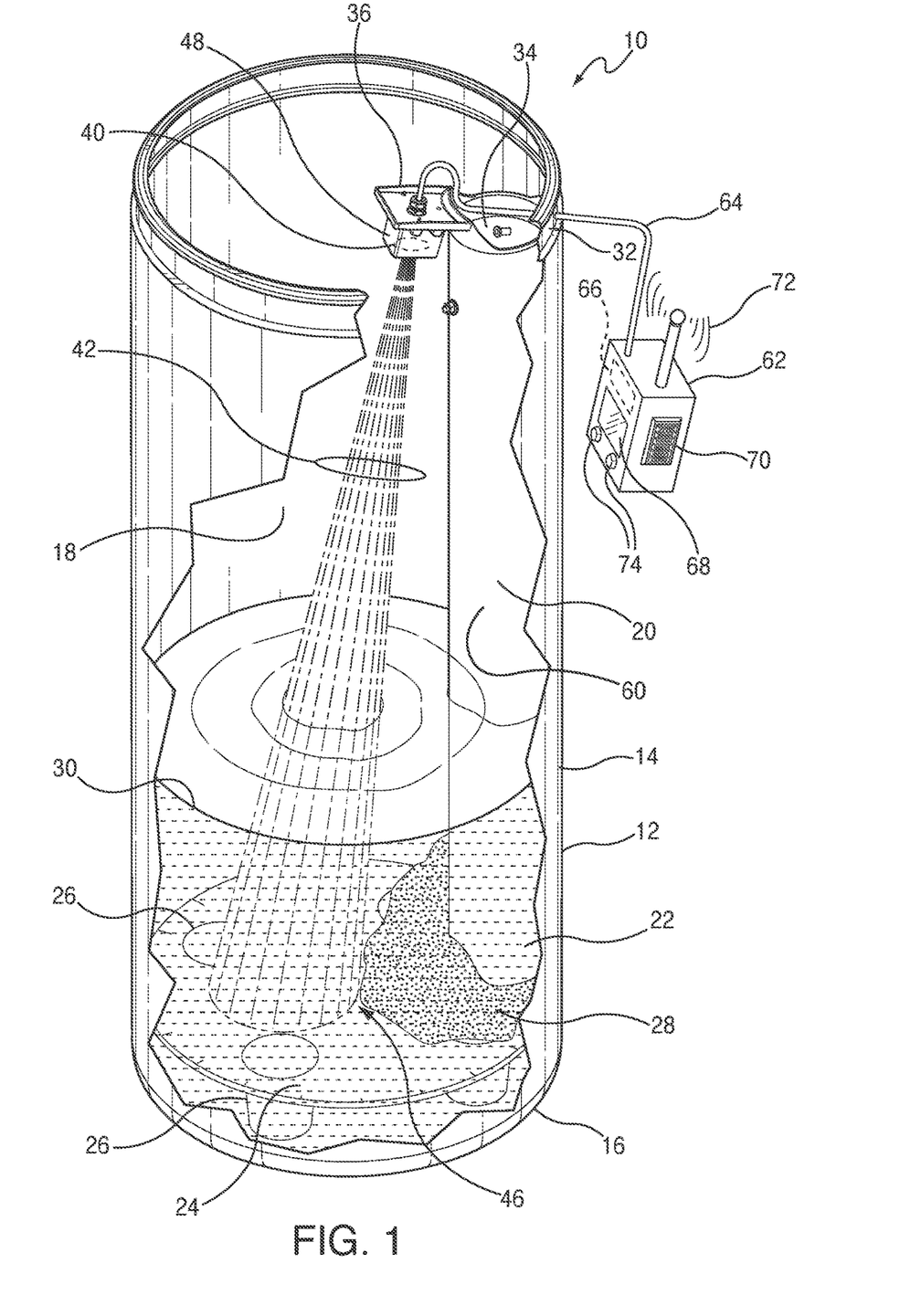
FIG. 1 is a top perspective view of a water softener brine tank equipped with the present salt level monitoring system.
Figure 2:
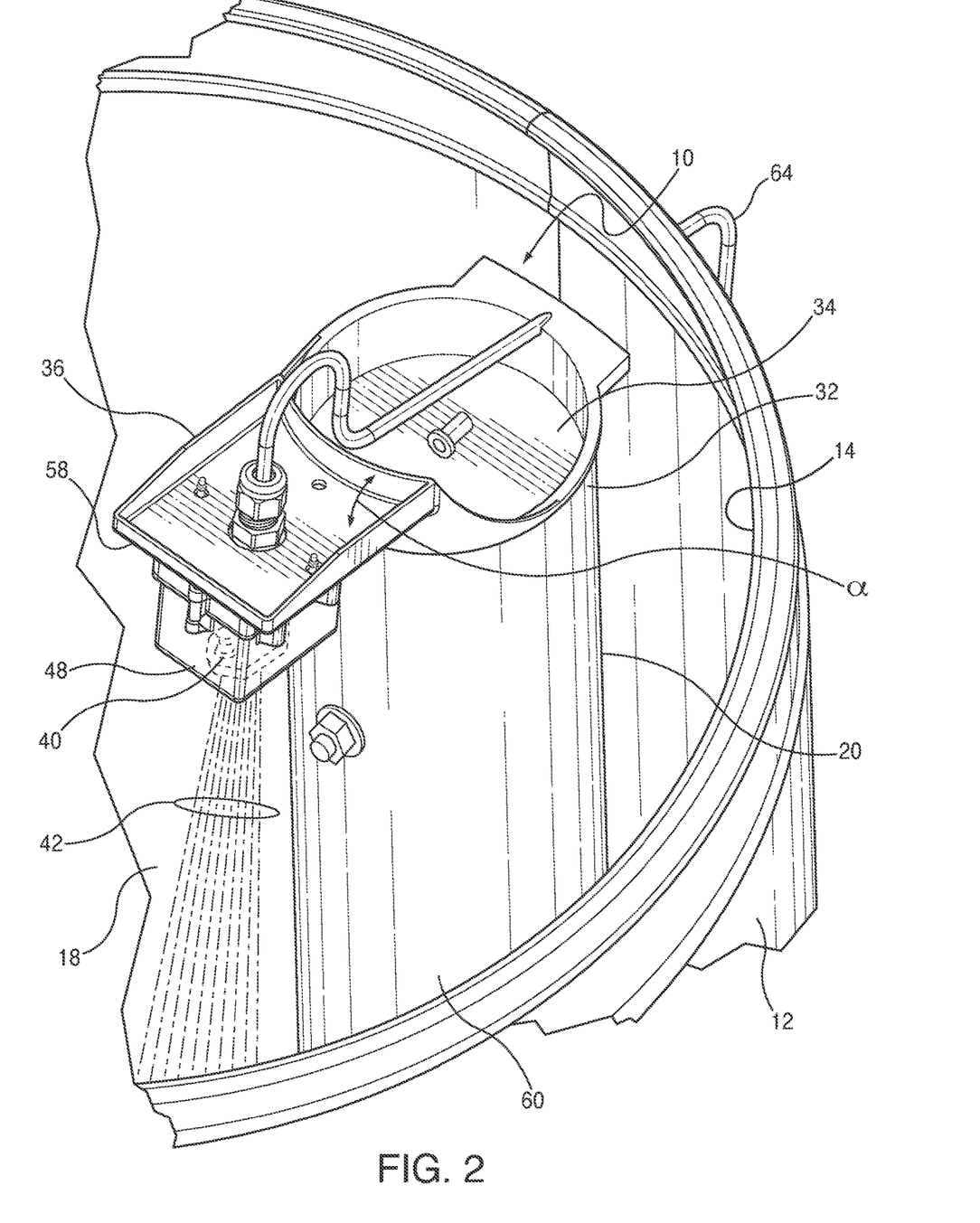
FIG. 2 is an enlarged, fragmentary view of the present system mounted in the brine tank.

Referring now to FIGS. 1 and 2, the present water softener salt monitoring system is generally designated 10. The present system 10 is intended for use with a conventional water softening system including a treatment tank (not shown) and a brine tank 12 in fluid communication with the treatment tank. Such systems are well known in the art and are described in detail in commonly-assigned U.S. Pat. Nos. 6,644,349; 6,696,966; 7,566,738; and 8,302,631, all of which are incorporated by reference. The brine tank 12 includes an outer wall 14 and a bottom 16 that defines an interior space 18. Inside the interior space is a generally tubular, and a generally vertically oriented brine well 20 attached to the brine tank 12 and from which brine generated in the brine tank is periodically drawn into the treatment tank during the regeneration phase of the softener operational cycle.

More specifically, also as is well known in the art, a control valve (not shown) on the softener treatment tank is configured for periodically scheduling a regeneration or refreshing of the treatment media to replace calcium and magnesium "hard" ions with salt-derived sodium "soft" ions. The hard ions are flushed to drain. Part of the regeneration phase includes a "brine draw" segment, where brine from the brine tank 12 is drawn into the treatment tank. As described above, one operational problem of water softeners is that the salt stored in the brine tank for forming brine often forms salt "bridges" where an upper layer or portion of the salt crystallizes and hardens, while salt near the bottom 16 of the tank is used to make the brine and creates a cavity. As such, the amount of salt in the brine tank 12 is misleading to the user.

Included on the brine well is a lower end 22 contacting the bottom 16 or an optional brine plate or floor 24 of the brine tank 12, the floor being suspended from the bottom 16 by feet or standoffs 26. As is customary in the art, the floor 24 is preferably perforated to permit the flow of liquid to and from the brine tank bottom 16 to the rest of the interior space 18, and also into the brine well 20. A supply of salt 28 is maintained upon the floor 24, and the brine tank interior space 18 typically retains a level of water 30 that is mixed with the salt to form brine. Proper operation of the softener requires that the user maintain the level of salt 28 in the brine tank 12.

Referring now to FIGS. 1 and 2, an upper end 32 of the brine well 20 is provided with a cap 34, preferably having a sensor bracket 36. While, in the preferred embodiment, the sensor bracket 36 is integrally formed, as by welding, molding or the like, to the cap 34, other conventional alternate fastening technologies are contemplated, including but not limited to threaded fasteners, rivets, and/or chemical adhesive. The sensor bracket 36 is preferably constructed and arranged to project farther into the tank interior space 18 from the brine well 20, so that the brine well is between the sensor bracket and the tank outer wall 14.

Referring now to FIGS. 1-5, a sensor 40 is secured to the brine tank 12 and constructed and arranged for sending a signal to the bottom 16, or to the floor 24. More specifically, it is preferred that the sensor 40 is secured to the brine well 20 and is powered by a battery or line cord power. In the preferred embodiment, the sensor 40 is a Time of Flight (ToF) sensor configured for transmitting a light beam signal, more preferably a laser signal depicted as a beam 42. However, for the present system 10, alternate sensors are contemplated that are configured for sending directed light and/or sound signals in a manner to that described below in greater detail regarding the ToF sensor 40. The ToF sensor 40 includes an internal receiver 44 that is configured for receiving the signal 42 reflected backward after the beam impacts an interrupting surface that has sufficient optical density or opacity. In the present system, the receiver 44 is configured for receiving a reflected signal off of at least one of the quantity of salt, the quantity of water and salt, the bottom 16, and the floor 24.

Figure 3:
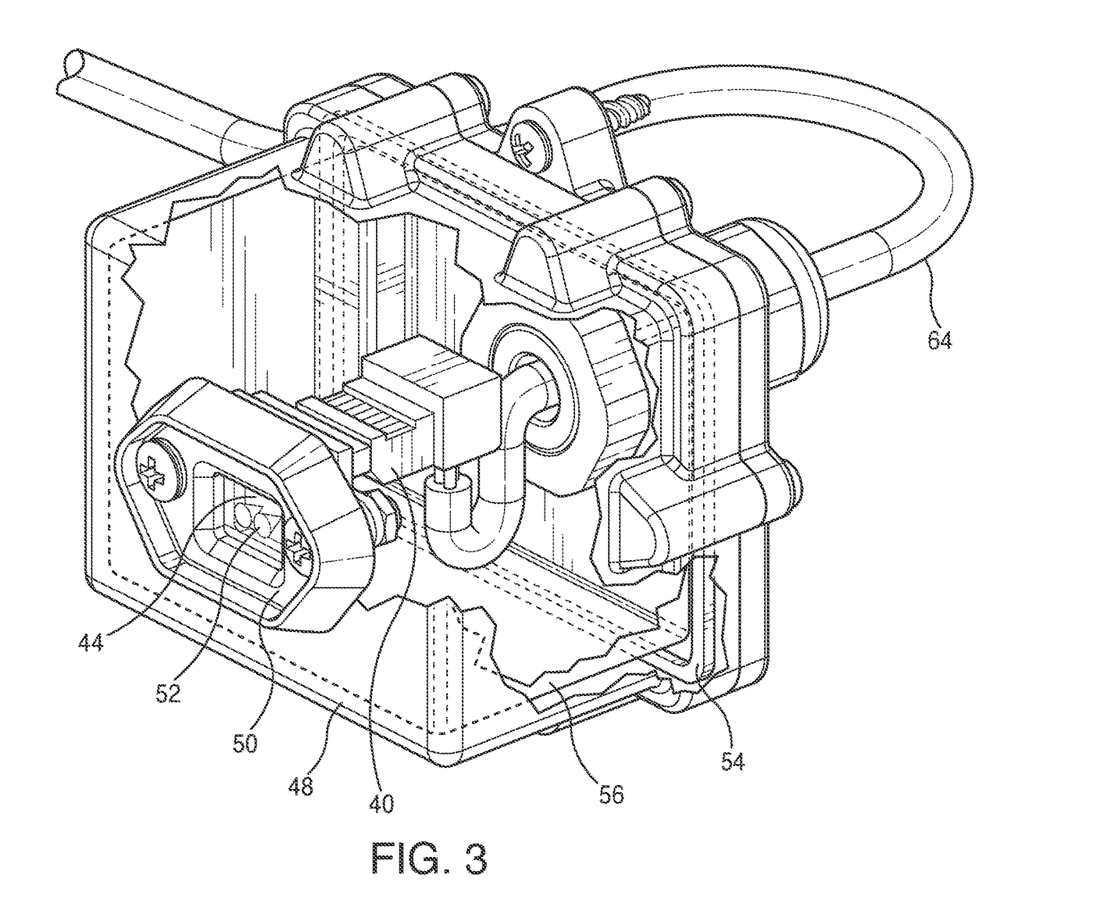
FIG. 3 is a top perspective view of the present sensor enclosed within a protective cover.

More specifically, the ToF sensor 40 is constructed and arranged in the brine tank 12 to direct the sensor beam to a central region 46 (FIG. 1) of the bottom 16, and optionally the brine plate or floor 24 largely defined by the feet or standoffs 26. During normal softener operation, this region 46 is typically covered by a layer of the salt 28 having a recommended thickness or height. The preferred orientation of the sensor beam 42 is achieved by the orientation of the sensor bracket 36 as attached to the brine well 20. As seen in FIGS. 2 and 3, the ToF sensor 40 is enclosed in a protective case 48 including a lens cap 50 covering a signal transmitter 52 as well as the receiver 44 of the sensor. The protective case 48 shields the transmitter 40 from unwanted splashing and contact with the potentially corrosive brine solution, and accordingly includes a gasket or seal 54 (FIG. 3) defining a protected interior 56 of the case for retaining the sensor 40. Also, in a preferred embodiment, the protective case 48 is mounted to an underside 58 of the sensor bracket 36.

Figure 4:
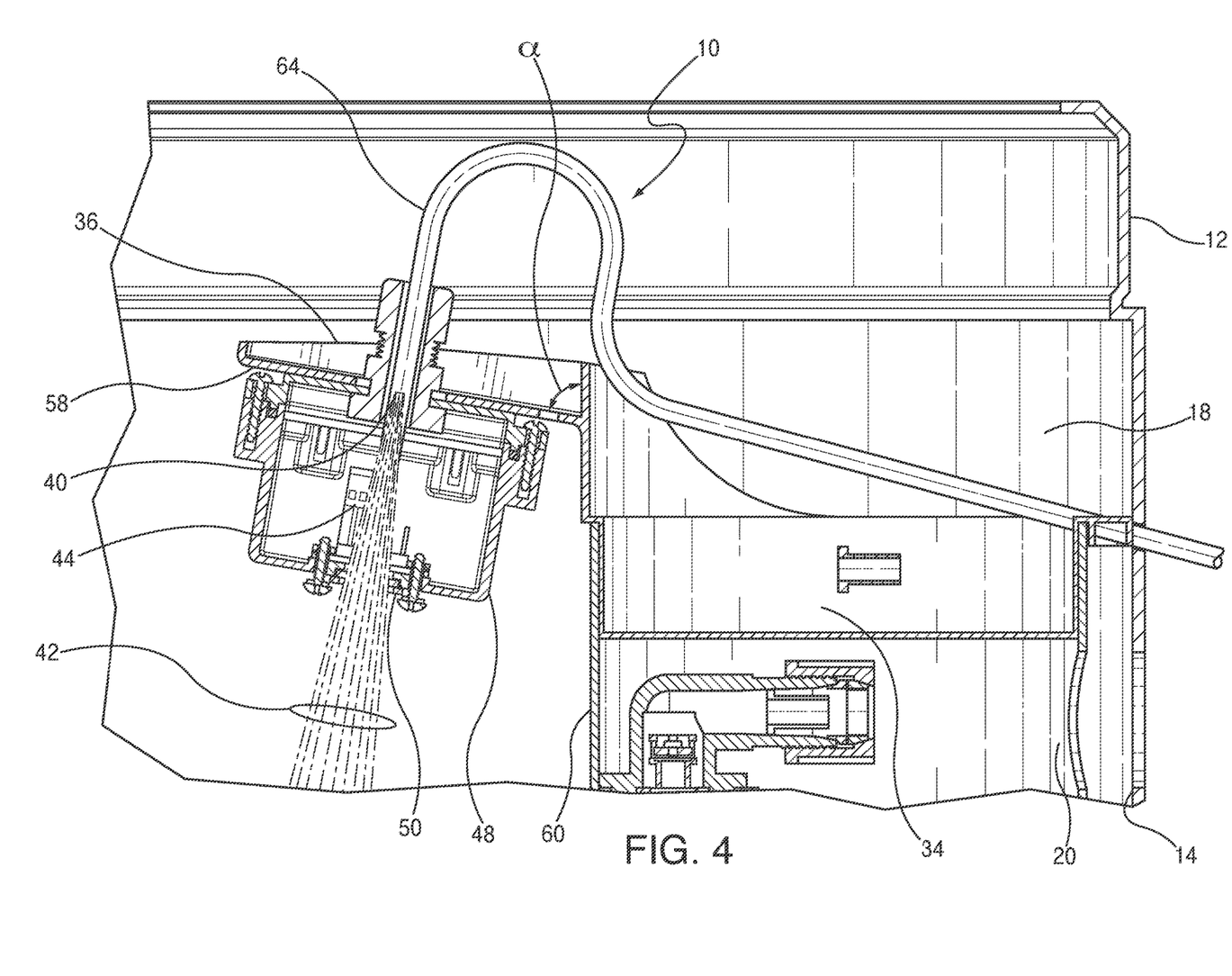
FIG. 4 is a vertical cross-section of the sensor of FIG. 3.
Figure 5:
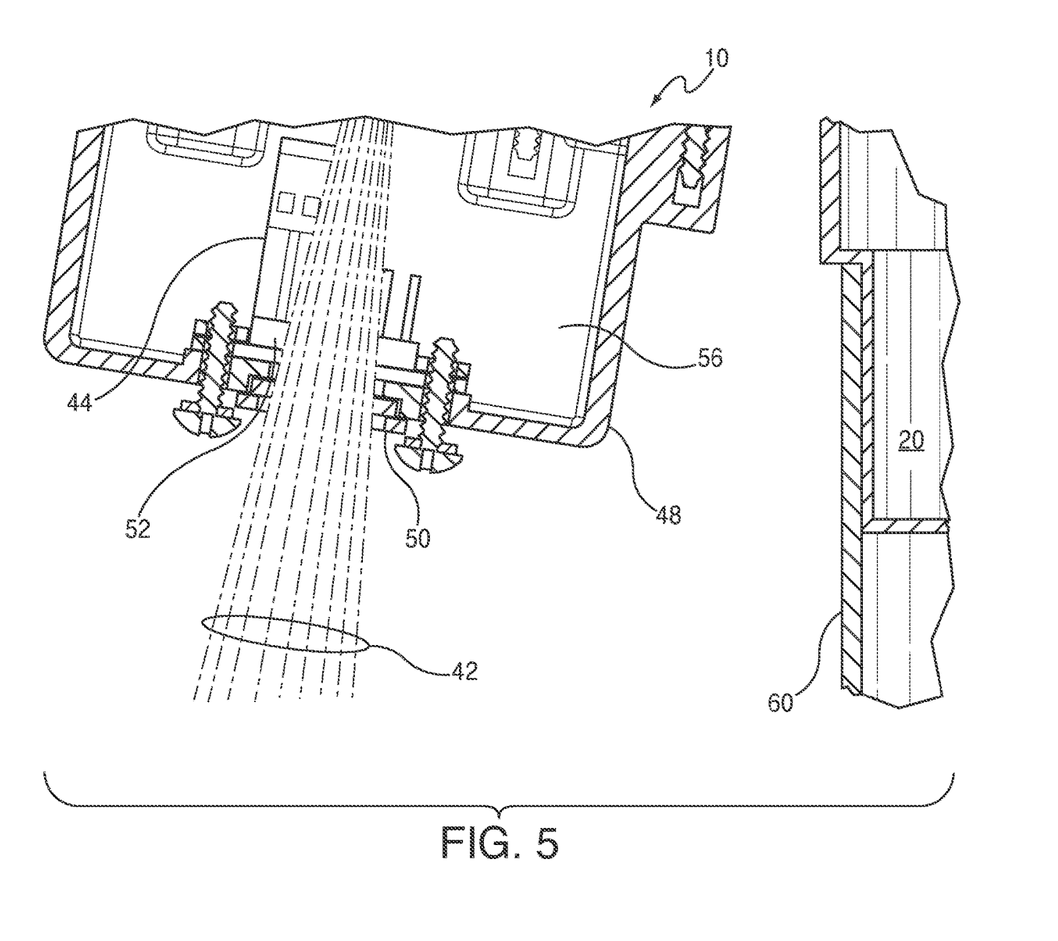
FIG. 5 is an enlarged vertical cross-section of the sensor of FIG. 4.

Referring now to FIGS. 2, 4 and 5, the sensor bracket 36 is configured to define an angle α relative to the vertical brine well 20 so that the sensor beam 42 is directed at the target central floor region 46. In the preferred embodiment, α is in the range of 75-85°, however other orientations are contemplated, depending on the application, provided that the targeted direction of the sensor beam 42 is achieved. Besides, and in addition to the angle α, the sensor bracket 36 is configured so that the sensor 40 is mounted approximately 0.5-5 inches from an exterior wall 60 of the brine well 20. More preferably, the sensor 40 is mounted approximately 0.5-2.8 inches±0.2 inches from the exterior wall 60 of the brine well 20.

Referring now to FIGS. 1-4, the sensor 40 is electrically connected to a controller 62 (FIG. 1), either through an electric cable 64 or wirelessly, as is known in the art. Included in the controller 62 is a processor 66 which is preferably programmable and has an incorporated algorithm for comparing received signals from the receiver 44, and converting them into time/distance values indicative of the distance of an upper level of the salt 28 from the sensor 40. As is well known in the art, the programmable processor 66 includes executable, non-transitory instructions stored thereon, or the processor is encoded with executable hardware/(non-transitory) software/firmware instructions. Typical examples of the processor 66 are a central processing unit (CPU), a computer, a microprocessor, or an application-specific integrated circuit (ASIC). Further, the processor 66 stores preset values of expected rates of decrease of the height of the salt 28 in the brine tank 12 over time in the form of a specified number of regeneration cycles.

Another feature of the processor 66 is that deviations from the expected rates of decrease of the salt height over time are also programmed for the generation of alarm signals. In the present context, "alarm signals" will be understood to mean visual alarms indicated on a display 68 associated with the controller 62, audible alarms broadcast through a speaker 70 associated with the controller 62, as well as remotely directed signals 72 sent wirelessly or through modems or the like, to a service provider and/or the manufacturer of the system 10. Also included on the controller 62 is at least one user input 74 such as a button, knob, touch pad or the like enabling the user or a service technician to set desired parameters of the system 10 such as the size of the brine tank 12, type of salt to be used, model of softener valve, and other such information that might impact the rate of salt usage in the brine tank. It is contemplated that the controller 62 is optionally attached to, associated with, or remote from, the brine tank 12.

Figure 6:
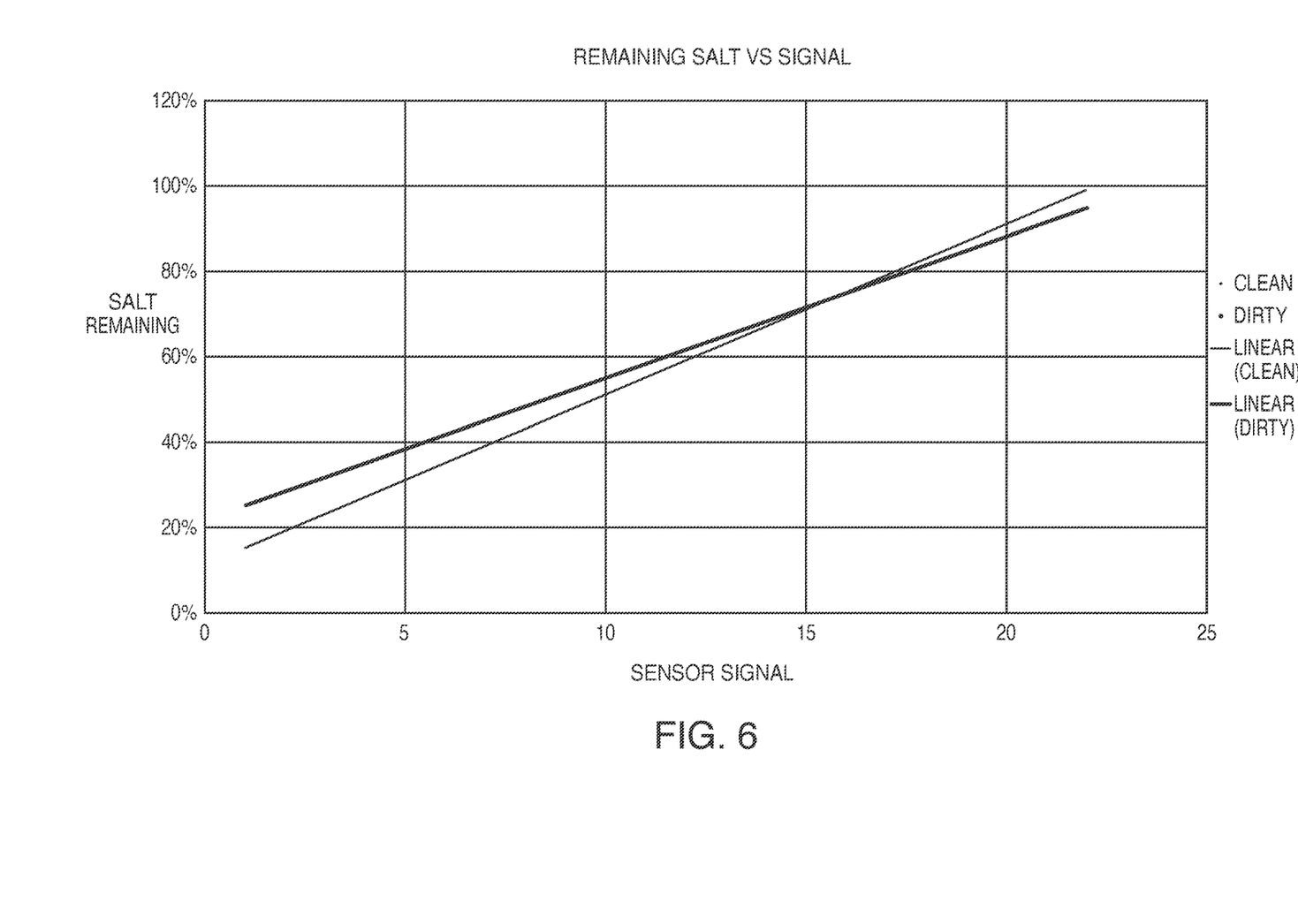
FIG. 6 is a graphical representation of sensor signal strength and percentage salt remaining in the brine tank.

Referring now to FIG. 6, included in the data stored in the processor 66 is the preferred rate of decline of the salt level in the brine tank 12, represented by the strength of the reflected sensor beam 42 compared with the amount of salt remaining in the brine tank. In other words, as the salt level decreases in the brine tank 12, the sensor beam 42 travels longer/farther from the sensor, and as such the reflected signal at the receiver 44 has a longer time of travel as the salt level declines.

Figure 7:
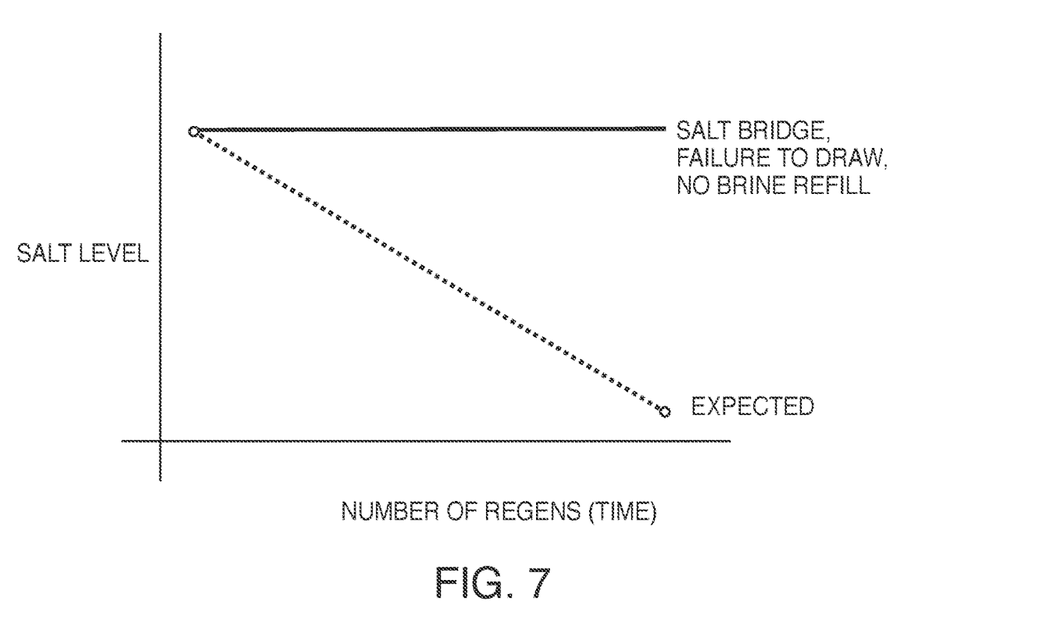
FIG. 7 is a graphical representation of signals received when a salt bridge is in the brine tank.

Referring now to FIG. 7, in the preferred embodiment of the present salt monitoring system 10, the sensor 40 is configured for generating a signal in the form of the sensor beam 42 at a regular interval, preferably at least each time brine draw begins during the regeneration operation, and the controller 62 is configured so that upon multiple signals being received indicating the same salt level, an alarm signal is generated. The reception of multiple salt levels at the same height indicates the presence of a salt bridge as well as a failure to draw brine, or no brine refill, all of which alert the user and/or a service technician that the brine tank needs maintenance.

Figure 8:
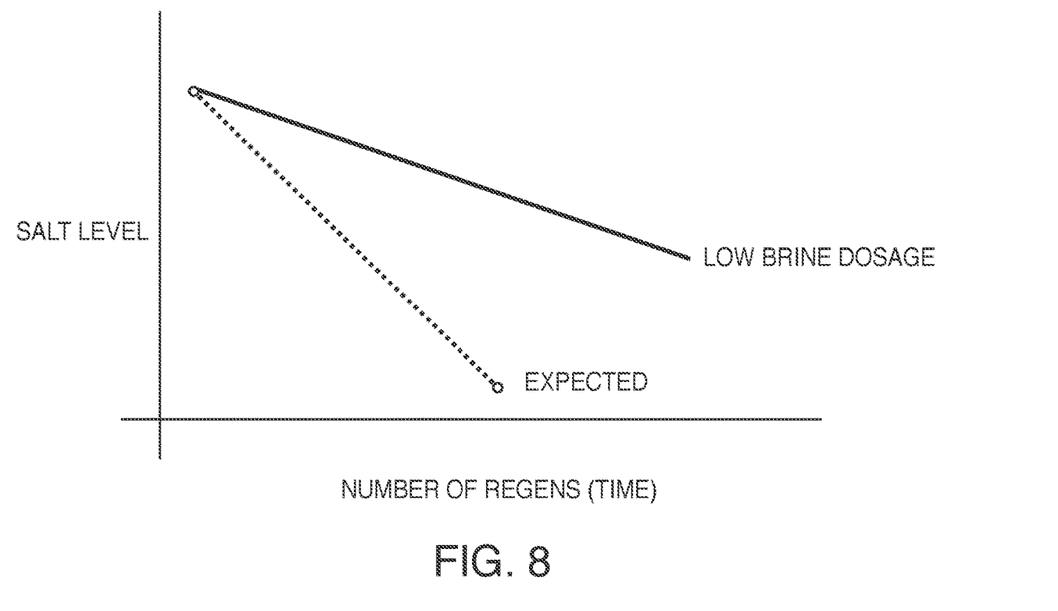
FIG. 8 is a graphical representation of signals received when there is low brine dosage.

Referring now to FIG. 8, the sensor 40 is configured for generating a signal in the form of the sensor beam 42 at a regular interval, and the controller 62 is also preferably configured so that upon multiple signals being received by the receiver 44 over a plurality of regenerations that indicate a slower than average or expected decline of the salt level over time, indicating low brine dosage, an alarm signal is generated.

Figure 9:
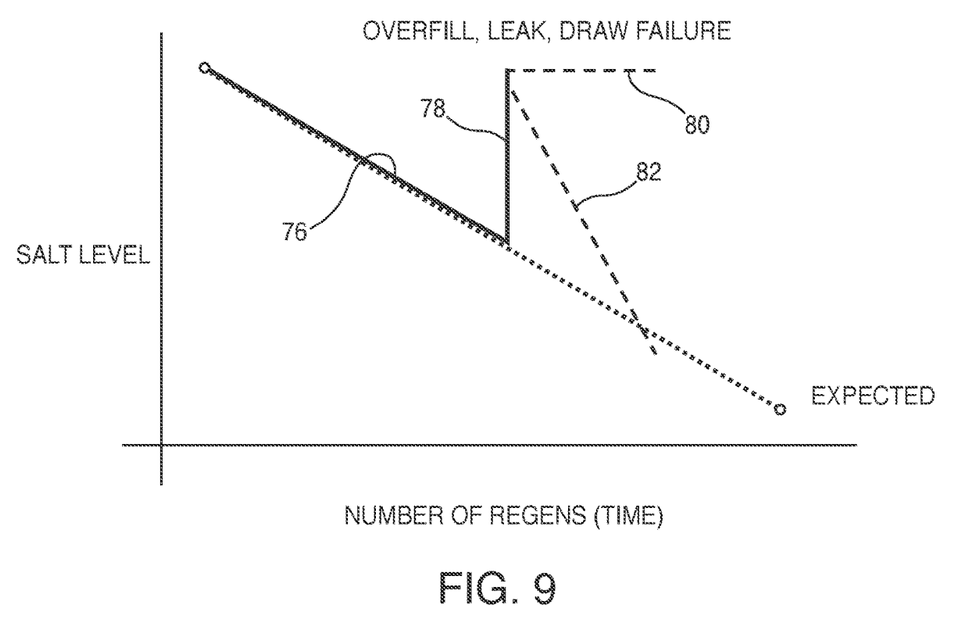
FIG. 9 is a graphical representation of signals received when there is an overfill leak or draw failure.

Referring now to FIG. 9, the sensor 40 is configured for generating a signal in the form of the sensor beam 42 at a regular interval, and the controller 62 is also preferably configured so that upon multiple signals being received by the receiver 44 over a plurality of regenerations that indicate a first phase 76 of salt depletion that is at the expected rate, followed by a second phase 78 indicating an abrupt increase in salt or brine level in the brine tank 12, indicating an overfill, a leak or brine draw failure, an alarm signal is generated. In some cases, the second phase 78 is followed by a third phase 80 of sustained high salt level, or a fourth phase 82 of rapidly declining salt or brine level, depending on the malfunction.

Figure 10:
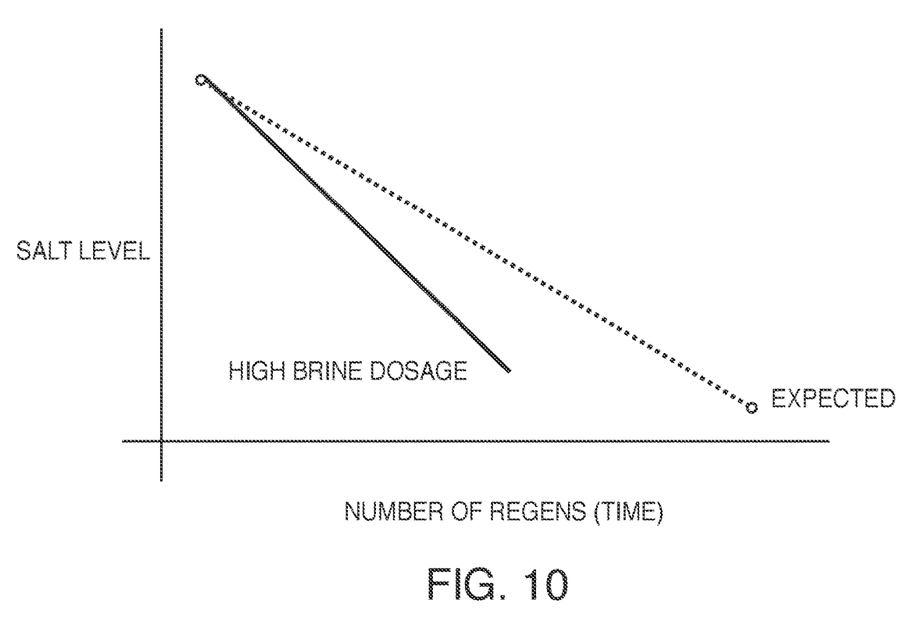
FIG. 10 is a graphical representation of signals received when there is high brine dosage, indicating a system leak.

Referring now to FIG. 10, the sensor 40 is configured for generating a signal in the form of the sensor beam 42 at a regular interval, and the controller 62 is also preferably configured so that upon multiple signals being received by the receiver 44 over a plurality of regenerations that indicate an increased rate of salt usage, reflecting high brine dosage, an alarm signal is generated.

Figure 11:
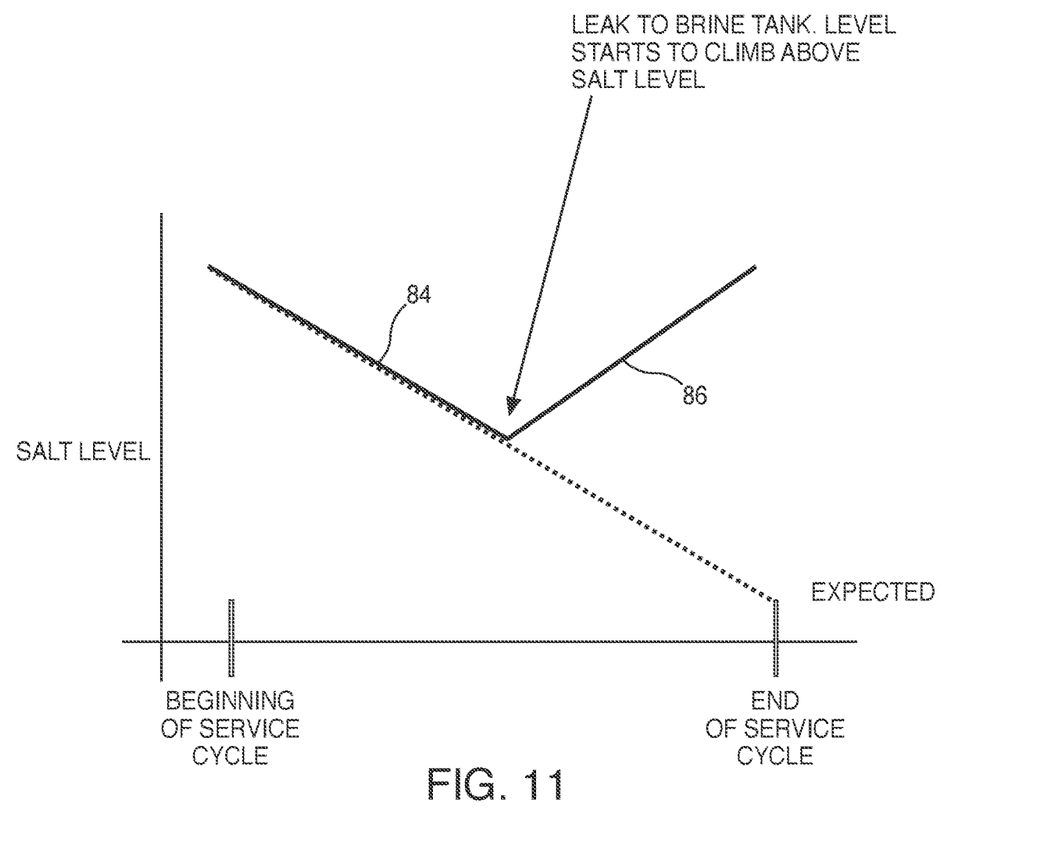
FIG. 11 is a graphical representation of signals received when there is a leak to the brine tank.

Referring now to FIG. 11, the sensor 40 is configured for generating a signal in the form of the sensor beam 42 at a regular interval, and the controller 62 is also preferably configured so that upon multiple signals being received by the receiver 44 over a plurality of regenerations that indicate a first phase 84 of regular salt consumption, followed by a second phase 86 of increase signal level or water level, indicating a leak to the brine tank 12, an alarm signal is generated.

It is contemplated that the above-described deviations are pre-programmed into the processor 66 so that malfunction-appropriate alarms are shown on the display 68 or transmitted at 72. Also, while a preferred schedule for transmitting signals from the sensor 40 is at or after the brine draw, other intervals are contemplated, including but not limited to clock-based intervals by minute, hour, etc. Further, the rate of salt depletion in some cases is due to the type of salt used, which is a parameter that is optionally entered into the controller by the user input 74 at the beginning of operation.

Another indication of erratic salt depletion rates is that the brine tank 12 needs cleaning.

While a particular embodiment of the present water softener salt monitoring system has been described herein, it will be appreciated by those skilled in the art that changes and modifications may be made thereto without departing from the invention in its broader aspects and as set forth in the following claims.

What is claimed is:

1. A water softener salt monitoring system, comprising:
    a brine tank configured for retaining a quantity of salt, a quantity of water and having a bottom;
    a brine plate disposed above said bottom of said brine tank, said brine plate being perforated to permit the flow of liquid;
    a sensor secured to the brine tank and constructed and arranged for sending a signal to said brine plate, said sensor including a receiver configured for receiving a reflected signal off of at least one of the quantity of salt, the quantity of water and the brine plate;
    a controller connected to said sensor and programmed to compare said reflected signals with preset values, and for generating an alarm signal upon receipt of deviations from said preset values; and
    a vertically oriented brine well disposed within said tank, a bottom of said vertically oriented brine well contacting said bottom of said brine tank.

2. The salt monitoring system of claim 1, wherein said sensor is attached to said brine well.

3. The salt monitoring system of claim 2, wherein said sensor is mounted approximately 0.5-5 inches from said brine well.

4. The salt monitoring system of claim 2, wherein said sensor generates a beam focused on a central region of said brine plate.

5. The salt monitoring system of claim 1, wherein said sensor is a Time of Flight sensor.

6. The salt monitoring system of claim 1, wherein said sensor is enclosed in a protective case including a lens cap covering a signal transmitter of said sensor.

7. The salt monitoring system of claim 1, wherein said controller includes a programmable processor, a user display, at least one user input, and at least one speaker.

8. The salt monitoring system of claim 1, wherein said sensor is configured for generating a signal each time brine draw ends or some time or before brine fill, and said controller is configured so that upon multiple signals are received indicating the same salt level, an alarm signal is generated.

9. The salt monitoring system of claim 1, wherein said sensor is configured for generating a signal at a regular interval, and said controller is configured so that upon said received signal depicting a slower than average decline of salt level, indicating low brine dosage, an alarm signal is generated.

10. The salt monitoring system of claim 1, wherein said sensor is configured for generating a signal at a regular interval, and said controller is configured so that upon said received signals depicting an increased salt or water level, an alarm signal is generated.

11. The salt monitoring system of claim 1, wherein said sensor is configured for generating a signal at a regular interval, and said controller is configured so that upon said received signals depicting an increased rate of salt usage, reflecting high brine dosage, a leak to the brine tank or overfilling of the brine tank, an alarm signal is generated.

12. The salt monitoring system of claim 1, wherein said sensor is configured for generating a signal at a regular interval, and said controller is configured to that upon said received signals indicating a first phase of regular salt consumption, followed by a second phase of rising water consumption, indicating a leak to said brine tank, an alarm signal is generated.

13. A water softener salt monitoring system, comprising:
a brine tank configured for retaining a quantity of salt, a quantity of water and having a bottom;
a sensor secured to the brine tank and constructed and arranged for sending a signal to said bottom, said sensor including a receiver configured for receiving a reflected signal off of at least one of the quantity of salt, the quantity of water and the bottom;
a controller connected to said sensor and programmed to compare said reflected signals with preset values, and for generating an alarm signal upon receipt of deviations from said preset values;
said brine tank includes a brine well disposed within said tank, said sensor being attached to said brine well at an angular orientation with respect to said brine well so that said sensor generates a beam focused on a central region of said bottom, wherein said angular orientation includes a non-zero angle such that said sensor is non-parallel with said brine well.

14. The salt monitoring system of claim 13, wherein said sensor is configured for generating a signal at a regular interval, and said controller is configured to that upon said received signals indicating that a measured salt level varies from an expected value by more than a threshold amount, corrective procedures are initiated.

15. The salt monitoring system of claim 13, wherein said controller includes a programmable processor, a user display, at least one user input, and at least one speaker.

16. The salt monitoring system of claim 13, wherein said sensor is configured for generating a signal each time brine draw ends or some time or before brine fill, and said controller is configured so that upon multiple signals are received indicating the same salt level, an alarm signal is generated.

17. The salt monitoring system of claim 13, wherein said sensor is configured for generating a signal at a regular interval, and said controller is configured so that upon said received signal depicting one of a slower than average decline of salt level, indicating low brine dosage, an increased salt or water level, and an increased rate of salt usage, reflecting high brine dosage, a leak to the brine tank or overfilling of the brine tank, an alarm signal is generated.

18. The salt monitoring system of claim 13, wherein said sensor is configured for generating a signal at a regular interval, and said controller is configured to that upon said received signals indicating a first phase of regular salt consumption, followed by a second phase of rising water consumption, indicating a leak to said brine tank, an alarm signal is generated.

19. A monitoring system is provided for use in a tank configured to house a volume of material in a volume of water, comprising:
a sensor is secured within the tank and is configured to periodically gauge a level of the material within the tank by transmitting a signal to the volume of material; and
a receiver associated with said sensor is connected to a controller programmed to measure the received signal, taking the form of a level reading and compare the most recent level reading with at least one previous level reading, and to take corrective action when the most recent level readings differs from an expected value, including generating an alarm signal;
wherein said sensor is configured for generating a signal at a regular interval, and
wherein said controller is configured so that at least one of:
upon said received signals indicating a first phase of regular material consumption, followed by a second phase of rising water consumption, indicating a leak to the tank, an alarm signal is generated;
upon said received signals depicting an increased rate of material consumption, reflecting high material dosage or a leak to the tank, an alarm signal is generated; and
upon said received signal depicting a slower than average decline of material level, indicating low material dosage, an alarm signal is generated.

20. A water softener salt monitoring system, comprising:
a brine tank configured for retaining a quantity of salt, a quantity of water and having a bottom;
a sensor secured to the brine tank and constructed and arranged for sending a signal to said bottom, said sensor including a receiver configured for receiving a reflected signal off of at least one of the quantity of salt, the quantity of water and the bottom; and
a controller connected to said sensor and programmed to compare said reflected signals with preset values, and for generating an alarm signal upon receipt of deviations from said preset values,
wherein said sensor is configured for generating a signal at a regular interval, and said controller is configured so that upon said received signal depicting a slower than average decline of salt level, indicating low brine dosage, an alarm signal is generated.

21. A water softener salt monitoring system, comprising:
a brine tank configured for retaining a quantity of salt, a quantity of water and having a bottom;
a sensor secured to the brine tank and constructed and arranged for sending a signal to said bottom, said sensor including a receiver configured for receiving a reflected signal off of at least one of the quantity of salt, the quantity of water and the bottom; and
a controller connected to said sensor and programmed to compare said reflected signals with preset values, and for generating an alarm signal upon receipt of deviations from said preset values;
wherein said sensor is configured for generating a signal at a regular interval, and said controller is configured to that upon said received signals indicating a first phase of regular salt consumption, followed by a second phase of rising water consumption, indicating a leak to said brine tank, an alarm signal is generated.

* * * * *